US012668381B2

(12) United States Patent
Lasa Aguirrebengoa et al.

(10) Patent No.: US 12,668,381 B2
(45) Date of Patent: Jun. 30, 2026

(54) OMNIDIRECTIONAL VEHICLE WITH PASSIVE REVOLUTE JOINTS

(71) Applicant: Fundación Tecnalia Research & Innovation, Derio (ES)

(72) Inventors: Joseba Lasa Aguirrebengoa, Derio (ES); Imanol Iriarte Arrese, Derio (ES); Iñaki Iglesias Aguinaga, Derio (ES)

(73) Assignee: Fundación Tecnalia Research & Innovation, Derio (ES)

( * ) Notice: Subject to any disclaimer, the term of this patent is extended or adjusted under 35 U.S.C. 154(b) by 0 days.

(21) Appl. No.: 18/860,063

(22) PCT Filed: Apr. 20, 2023

(86) PCT No.: PCT/EP2023/060286
§ 371 (c)(1),
(2) Date: Oct. 25, 2024

(87) PCT Pub. No.: WO2023/208722
PCT Pub. Date: Nov. 2, 2023

(65) Prior Publication Data
US 2025/0282500 A1     Sep. 11, 2025

(30) Foreign Application Priority Data

Apr. 25, 2022     (EP) .................................... 22382391

(51) Int. Cl.
*B64U 30/297*          (2023.01)
*B64U 10/16*           (2023.01)
(Continued)

(52) U.S. Cl.
CPC ........... *B64U 30/297* (2023.01); *B64U 10/16* (2023.01); *B64U 20/80* (2023.01); *B64U 40/10* (2023.01)

(58) Field of Classification Search
CPC ....... B64U 30/297; B64U 40/10; B64U 20/80
(Continued)

(56) References Cited

U.S. PATENT DOCUMENTS 10,351,234 B1 * 7/2019 Dennis .................... B64C 27/52
12,043,377 B2 * 7/2024 Renteria .............. B64U 30/297
(Continued)

FOREIGN PATENT DOCUMENTS

CN           110615094          12/2019
WO     WO-2016028358 A2 *  2/2016   ............. B64U 50/14
(Continued)

OTHER PUBLICATIONS

International Search Report and the Written Opinion Dated Jul. 20, 2023 From the International Searching Authory Re. Application No. PCT/EP2023/060286. (14 Pages).

*Primary Examiner* — Joshua D Huson

(57)          ABSTRACT

An omnidirectionally orientable vehicle comprising a main body, arms extending radially therefrom and orientable propulsion modules. Each propulsion module is coupled to an arm and comprises at least three propulsion units rigidly attached to the propulsion module. Each propulsion module is coupled to the arm by interposition of a rotary junction formed by a first revolute joint coupled to the arm and a second revolute joint attached to the propulsion module and perpendicularly coupled to the first revolute joint. The first revolute joint allows the propulsion module to rotate around the arm and the second revolute joint allows the propulsion module to rotate around an axis perpendicular to the arm providing the propulsion module with two DOF relative to the main body. The vehicle comprises rotary encoders located in proximity to the revolute joints and configured to monitor the orientation of the propulsion modules relative to the main body.

13 Claims, 9 Drawing Sheets

(51) Int. Cl.
  *B64U 20/80*    (2023.01)
  *B64U 40/10*    (2023.01)

(58) Field of Classification Search
  USPC ........................................................ 244/17.23
  See application file for complete search history.

(56)      References Cited

U.S. PATENT DOCUMENTS

| | | | |
|---|---|---|---|
| 2009/0084890 | A1 | 4/2009 | Reinhardt |
| 2016/0325829 | A1* | 11/2016 | Ahn ........................ B64U 10/14 |
| 2016/0347443 | A1* | 12/2016 | Lee ........................ G05D 1/0011 |
| 2018/0148169 | A1 | 5/2018 | Zhang et al. |
| 2018/0354607 | A1* | 12/2018 | Marot .................... B64U 50/19 |
| 2021/0061463 | A1* | 3/2021 | Briod .................... B64U 30/24 |

FOREIGN PATENT DOCUMENTS

| | | |
|---|---|---|
| WO | WO 2020/109100 | 6/2020 |
| WO | WO 2020/229847 | 11/2020 |
| WO | WO 2022/046660 | 3/2022 |

* cited by examiner

116

119

113

119

126a 127c    133    113

132c 123.2

129c 122.2

121.2

120.2

121.1    134

107

129b 126b    127b    117

133

113

119

119

130

129a    126a

127a

132a 123.1

122.1

120.1

132b

128

102a

OMNIDIRECTIONAL VEHICLE WITH PASSIVE REVOLUTE JOINTS

RELATED APPLICATIONS

This application is a National Phase of PCT Patent Application No. PCT/EP2023/060286 having International filing date of Apr. 20, 2023, which claims the benefit of priority of Europe Patent Application No. 22382391.5 filed on Apr. 25, 2022. The contents of the above applications are all incorporated by reference as if fully set forth herein in their entirety.

FIELD AND BACKGROUND OF THE INVENTION

This invention is related to the field of omnidirectional vehicles. Such vehicles are able to independently exert force and torque in the three dimensions of space, achieving full-actuation all over their configuration space. In particular, the omnidirectional vehicle herein disclosed incorporates two orthogonal passive revolute joints between its main body and its orientable propulsion modules and can have application for example in aerial, underwater and space manipulation and operations.

In order to fully describe the motion of a rigid body in a three-dimensional space, at least six variables are required. A popular convention is to express orientation using three consecutive rotations along the Z (yaw), Y (pitch) and X (roll) axes and position with three translational variables X, Y and Z. Thus, rigid bodies in three-dimensional space are said to have six independent degrees of freedom (DOF).

Parallel axis multirotors (such as quadrotors, hexarotors, etc.) are underactuated aerial vehicles. That is to say, they cannot simultaneously control the 6 DOF of their main body. In such devices, a controlled horizontal translation requires the sacrifice of angular control and vice-versa.

Lately, Unmanned Aerial Vehicles (UAVs) have succeeded in applications such as search and rescue operations, traffic monitoring, infrastructure inspection, agriculture or filming, among others. While most of these tasks exclusively rely on the passive sensing capabilities of the vehicles, recent advances in the field of aerial robotics seek to achieve active physical interaction of the vehicle with its environment, broadening the scope of this technology to activities such as work at heights, remote infrastructure maintenance or pick and place operations.

These kind of aerial manipulation applications usually require the attachment of a tool to the vehicle. Underactuated vehicles present the handicap that their position and orientation cannot be simultaneously controlled. One way of overcoming this lack of manoeuvrability is the attachment of actuation mechanisms such as gimbals or robotic arms to the main body of an underactuated vehicle. However, this solution increases vehicle weight, which reduces total payload and autonomy and it also entails high control complexity, as both subsystems present coupled dynamics.

Another possible solution is the rigid attachment of the manipulation tool to the main body of a fully-actuated vehicle. Fully-actuated vehicles independently control their position and orientation, which results in high manoeuvrability for tool operation tasks. A particularly interesting subset of fully-actuated aerial vehicles are omnidirectional vehicles. These systems satisfy the full-actuation conditions over their entire orientation space and are not limited to a specific range. Many omnidirectional vehicles rely on dedicated actuators (e.g., servo-motors) to tilt their thrusters and control the orientation of the net thrust vector with respect to the main vehicle body, however, these extra actuators increase the complexity of the architecture, adding weight and greater manufacturing and maintenance costs, as well as reducing vehicle safety and reliability.

Thus, there is a need in the art for omnidirectional fully-actuated vehicles with simple architectures, reduced costs at the same time that they present high performance, high precision and high manoeuvrability.

SUMMARY OF THE INVENTION

For overcoming the aforementioned drawbacks, the present invention discloses an omnidirectional vehicle based on an orientable thrust generating mechanism formed by a plurality of orientable propulsion modules connected to the main body (cabin) by means of passive rotary junctions formed by two consecutive revolute joints, whose rotation axes are to be coplanar and perpendicular.

A first object of the invention is an omnidirectional vehicle that comprises a main body, a plurality of arms extending radially from the main body and being coupled thereto and a plurality of orientable propulsion modules. Each orientable propulsion module is coupled to a respective arm of the plurality of arms and comprises at least three propulsion units. The at least three propulsion units are rigidly attached to the frame of the corresponding orientable propulsion module at fixed positions and orientations. That is to say, the propulsion units are rigidly attached to the frames of the corresponding orientable propulsion modules at fixed X, Y, and Z positions and at fixed yaw, roll and pitch angles. The thrust applied by each one of the propulsion units of a particular orientable propulsion module may be different from each other. Thus, the plurality of propulsion units of an orientable propulsion module may be configured to achieve any desired orientation and modulus for the net thrust vector of the propulsion modulus.

In turn, each orientable propulsion module is coupled to a respective arm of the plurality of arms by interposition of a rotary junction. Each rotary junction is formed by a first passive revolute joint coupled to the corresponding arm and a second passive revolute joint attached to the orientable propulsion module wherein the axis of rotation of the second revolute joint is perpendicular and coplanar to the rotation axis of the first revolute joint. The first revolute joint is configured to allow the orientable propulsion module to rotate around the arm and the second revolute joint is configured to allow the orientable propulsion module to rotate around a rotary shaft of the orientable propulsion module which is perpendicular to the arm such that the orientable propulsion module is provided with two DOF with respect to the main body. In order to fully control the relative orientation of the thrust vector of each orientable propulsion module with respect to the main body, no more than two DOF are required. For example, the rotary junction may be a single body in which both consecutive and perpendicular revolute joints are integrated or formed. Alternatively, each revolute joint may be integrated or formed in an individual body which are located consecutively to each other.

As used herein, the term "revolute joint", also called pin joint or hinge joint, may refer to a one-degree-of-freedom kinematic pair that is able to constrains the motion of two bodies to pure rotation along a common axis. The revolute joint does not allow translation, or sliding linear motion. A revolute joint can be made by a pin or knuckle joint, through a rotary bearing. The term "passive revolute joint" refers to revolute joints that are not actuated by any device or mechanism such as a motor, an actuator or similar.

Additionally, the omnidirectional vehicle comprises a rotary encoder located in proximity to each revolute joint, said rotary encoders being configured to monitor the orientation of each orientable propulsion module relative to the main body. The distance between the revolute joints and the respective rotary encoders will depend on the operational range of the encoders and will be sufficiently small to allow the encoders to monitor the rotation of the respective revolute joints. In particular, the rotary encoder located in proximity to the first revolute joint coupled to the arm monitors the angular position of said revolute joint (or the body in which the revolute joint is integrated) relative to the arm and the rotary encoder that is located in proximity to the second revolute joint which is coupled to the rotary shaft of the orientable propulsion module monitors the angular position of said revolute joint (or the body in which the revolute joint is integrated) relative to the rotary shaft, such that the combination of readings of the two rotary encoders of the same rotary junction will provide the orientation of the particular orientable propulsion module relative to the main body.

As used herein, the term "rotary encoder" may refer to electro-mechanical devices that are configured to monitor and convert the angular position or motion of a shaft or axle to analog or digital signals. The output of the rotary encoders provides information about the current shaft position or about the motion of the shaft. Rotary encoders can be absolute or incremental rotary encoders.

The motion of the orientable propulsion modules may be controlled by changing the relative thrust generated by each propulsion unit. Specifically, motion about the two rotation axes of the orientable propulsion modules (roll and pitch), can be controlled by changing the relative thrust generated by each propulsion unit. For example, roll and pitch can be achieved by increasing thrust in the propulsion units located on one side and reducing thrust in the propulsion units located on the opposite side. Horizontal motion may be achieved by causing the orientable propulsion modules to lean towards the intended direction of travel, and vertical motion is achieved by simultaneously increasing thrust in every propulsion unit (ascent), or by simultaneously decreasing thrust in each propulsion unit (descent). Angular motion of the main body is controlled by modifying the net thrust of each propulsion module. For instance, roll and pitch are controlled increasing thrust in the propulsion modules located on one side and reducing thrust in the propulsion modules located on the opposite side, while yaw can be controlled with a thrust vectoring strategy, where each propulsion module leans towards the direction of maximum torque.

By using passive revolute joints for coupling the orientable propulsion modules to the main body of the omnidirectional vehicle, it is possible to pass rotary shafts, in particular the rotary shafts coupled to the orientable propulsion module and the arms of the main body that also act as rotary shafts, through the respective rotary junctions without having to include any space in the body or bodies in which the revolute joints are formed or integrated for including devices such as inertial sensors (gyroscopes, accelerometers, magnetometers, etc.) to measure the orientation of the orientable propulsion modules relative to the main body. On the contrary, this orientation can be measured with external devices, such as the rotary encoders, reducing the complexity of the architecture of the rotary junctions and reducing their maintenance and manufacturing costs.

The measure of the orientation of the orientable propulsion modules relative to the main body, and thus of the omnidirectional vehicle itself, obtained with rotary encoders is more accurate than the orientation obtained by estimations calculated using estimation algorithms based on measurements from inertial sensors. Besides, it requires less on-board computation since the rotary encoders provide angles as relative measurements between the orientable propulsion modules and the main body instead of deriving the estimates from complex sensor fusion algorithms. Using rotary encoders further avoids drift problems that can occur with inertial sensors.

In some embodiments, which are not part of the present invention, the omnidirectional vehicle may have some rotary junctions with only one revolute joint so the respective orientable propulsion module has only one DOF. Preferably, in these implementations, the rest of orientable propulsion modules will have enough DOFs so the omnidirectional vehicle is overactuated. In some other embodiments, which are not part of the present invention, some of the orientable propulsion modules may be fixedly coupled to their respective arms.

Preferably, in these implementations, the rest of orientable propulsion modules will have enough DOFs so the omnidirectional vehicle is overactuated too.

In some embodiments, each rotary junction comprises a body having a first orifice through which the corresponding arm is inserted and around which the rotary junction is to rotate and a second orifice perpendicular to the first orifice through which a rotary shaft coupled to the respective orientable propulsion module is inserted and inside which the rotary shaft is to rotate. The rotary shaft may be an integral part of the orientable propulsion module or may be part of the rotary junction itself and being coupled to the orientable propulsion module.

In some embodiments, when a more accurate orientation measurement of the orientable propulsion modules relative to the main body is required (e.g., when the omnidirectional vehicle is to carry out high precision operations) inertial measurement units (IMUs), such as gyroscopes, accelerometers, magnetometers or any combination thereof, could be placed in the main body to combine the absolute angle measurement obtained by the rotary encoders with the angular velocity measurement obtained by the IMUs.

In some embodiments, the first and second orifices of the body of the rotary junction comprise respective rotary bearings or friction bushings with low frictional coefficient coupled to their inner surfaces so that the corresponding arm and rotary shaft rotate relative to the body by means of the rotary bearings. In some other embodiments, the bearings or bushings may be an integral part of the body.

In some embodiments, each propulsion unit is an independently controllable propulsion unit and is configured to generate an independent thrust modulus. Preferably, each propulsion unit is configured to generate a torque that can be dependent or independent with respect to the generated thrust modulus. The thrust modulus generated by each propulsion unit shall be independently controllable. Hence, it is the varying thrust (and possibly torque) of the different propulsion units what orientates the propulsion modules, without requiring dedicated actuators at the joints.

In some embodiments, the centres of rotation of the propulsion modules lay in the geometric axes of the main body, as well as on the plane defined by the geometric axes of the frame of the propulsion module. This allows avoiding collisions between the orientable propulsion modules and the main body of the omnidirectional vehicle at every possible configuration.

In some embodiments, the propulsion units may be any device or system able to provide a propelling or driving force. More particularly, the propulsion units are selected from a group comprising rotors, propellers, turboprop engines, jet engines, air ejectors and any combination thereof.

In some embodiments, the omnidirectional vehicle comprises a landing gear attached to a lower surface of the main body or a plurality of landing gears, each landing gear being attached to a lower surface of a respective orientable propulsion module. Any of these two configurations provides a stable configuration to the omnidirectional vehicle when landed.

In some embodiments, the centre of mass of the orientable propulsion modules is located below the centre of rotation of the rotary junction, so that the propulsion modules stay horizontal in their resting configuration.

In some embodiments, the omnidirectionally orientable vehicle is selected from a group comprising an omnidirectional aerial vehicle, an omnidirectional underwater vehicle, an omnidirectional space aerial vehicle or any combination thereof.

In some embodiments, the omnidirectional vehicle comprises slip rings electrically connecting the main body and the orientable propulsion modules. The slip rings are configured to allow transmission of at least one of data and electrical power between the main body and the orientable propulsion modules. These slips rings allow an unlimited number of turns of the rotary junctions, and more particularly, of the revolute joints.

In some embodiments, the omnidirectional vehicle comprises loose cables electrically connecting the main body and the orientable propulsion modules. These loose cables are combined with an automatic unwinding algorithms or mechanical limits to limit the number of loops of the loose cables. The loose cables are configured to allow transmission of at least one of data and electrical power between the main body and the orientable propulsion modules. Preferably, the mechanical limit is a screw mechanism with a stop.

In some embodiments, the omnidirectional vehicle comprises a controller located in the main body and configured to operate the plurality of orientable propulsion modules. Besides, the omnidirectional vehicle may further comprise a single battery or pack of batteries in the main body to provide electrical power to the orientable propulsion modules and to the rest of electrical and electronic components of the vehicle. Data and electrical power can be transmitted from the main body to the orientable propulsion modules via the slip rings or the loose cables. These embodiments are especially convenient for reducing costs, minimizing the components that can fail, facilitating the assembly of the vehicle and reducing the inertia of the propulsion modules, making the system more agile and efficient.

In some other embodiments, the omnidirectional vehicle comprises a primary controller located in the main body and a plurality of secondary controllers, each secondary controller being located in a corresponding orientable propulsion module. The plurality of secondary controllers are configured to operate the respective orientable propulsion modules they are mounted on and the primary controller is configured to manage the plurality of secondary controllers. This example provides a distributed management of the omnidirectional vehicle in which any one of the plurality of controllers may take control over the whole vehicle in case the controller currently in charge of managing the omnidirectional vehicle fails. Additionally, the omnidirectional vehicle may further comprise a single battery or pack of batteries in the main body and further single batteries or packs of batteries in at least one, preferably all, orientable propulsion module. Preferably, the batteries in the main body are to feed the electric and electronic components of the main body while the batteries in the propulsion modules are to feed the electric and electronic components of the respective propulsion modules. However, since data and electrical power can be transmitted from the main body to the orientable propulsion modules and vice versa via the slip rings or the loose cables, in the event of any battery failure or battery exhaustion, electrical power can be transmitted from the main body or any of the orientable propulsion modules to any component within the omnidirectional vehicle. While control redundancy increases security and reliability of the vehicle, power redundancy increases the operating autonomy of the vehicle.

In some embodiments, the omnidirectional vehicle is an overactuated omnidirectional vehicle. A vehicle is overactuated when it has more independent control inputs than the 6 controlled DOFs of the main body (cabin). Preferably, the omnidirectional vehicle can have three or more orientable propulsion modules, each propulsion module having at least three propulsion units to ensure that it is overactuated. Having an overactuated omnidirectional vehicle, it is possible to optimize some parameters of the vehicle operation such as optimizing energy consumption, reducing vibrations, etc.

In some examples, the rotary junctions, and more particularly the revolute joints, may comprise a quick release system such that the orientable propulsion modules are releasable attached to the main body. Having propulsion modules releasably attached to the main body facilitates the maintenance operations of the vehicle and allows scalability of the vehicle since the currently operated propulsion modules can be easily and quickly replaced with different propulsion modules.

In some examples, the rotary junctions, and more particularly the revolute joints, may comprise blocking mechanisms configured to temporarily block rotary movement of the revolute joints. These rotary junctions with temporary blocked DOFs may be useful for cruise modes where it is desired to ensure that the joints maintain their position independently of external disturbances.

In some examples, the rotary junctions, and more particularly the revolute joints, may comprise shock absorbing mechanisms configured to absorb shock impulses generated by the movement of the propulsion modules relative to the main body. These joints with shock absorbing means may improve stability and accuracy of the vehicle.

Preferably, the plurality of orientable propulsion modules are equidistantly located relative to a central point of the main body. In this way, the stability of the omnidirectional vehicle is maximized. In some other examples, and depending on the purpose and the particular architecture of the vehicle, the propulsion modules may be attached to the main body with a different distribution.

A second object of the invention is a method for manoeuvring an omnidirectional vehicle. The method comprises providing an omnidirectional vehicle as previously described. Preferably, the provided omnidirectional vehicle will be an overactuated omnidirectional vehicle. The method further comprises determining a displacement of the main body of the omnidirectional vehicle in cartesian space, determining, by a controller of the omnidirectional vehicle, a thrust and an orientation for the omnidirectional vehicle based on the desired displacement and determining, by the controller, the thrust and orientation of each one of the plurality of orientable propulsion modules based on the determined thrust and orientation of the omnidirectional vehicle. After that, the method comprises adjusting, by means of the controller, a tilt angle of each one the plurality of orientable propulsion modules by performing a rotational movement of each orientable propulsion module relative to the main body via the rotary junctions, the relative rotational movement being based on the determined orientation.

The solution herein disclosed provides omnidirectional fully-actuated vehicles with simple architectures and reduced costs. Moreover, the omnidirectional vehicle presents improved performance, stability and manoeuvrability and high precision which may be critical to perform tasks such as precision handling of sensitive loads, precision landings, etc., and in missions where flight conditions are changing (gusty wind, variable or mobile payload) or where complex and very demanding flight dynamics are required.

BRIEF DESCRIPTION OF THE SEVERAL VIEWS OF THE DRAWINGS

To complete the description and in order to provide a better understanding of the invention, a set of drawings is provided. Said drawings form an integral part of the description and illustrate embodiments of the invention, which should not be interpreted as restricting the scope of the invention, but just as an example of how the invention can be carried out. The drawings comprise the following figures.

DESCRIPTION OF SPECIFIC EMBODIMENTS OF THE INVENTION

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
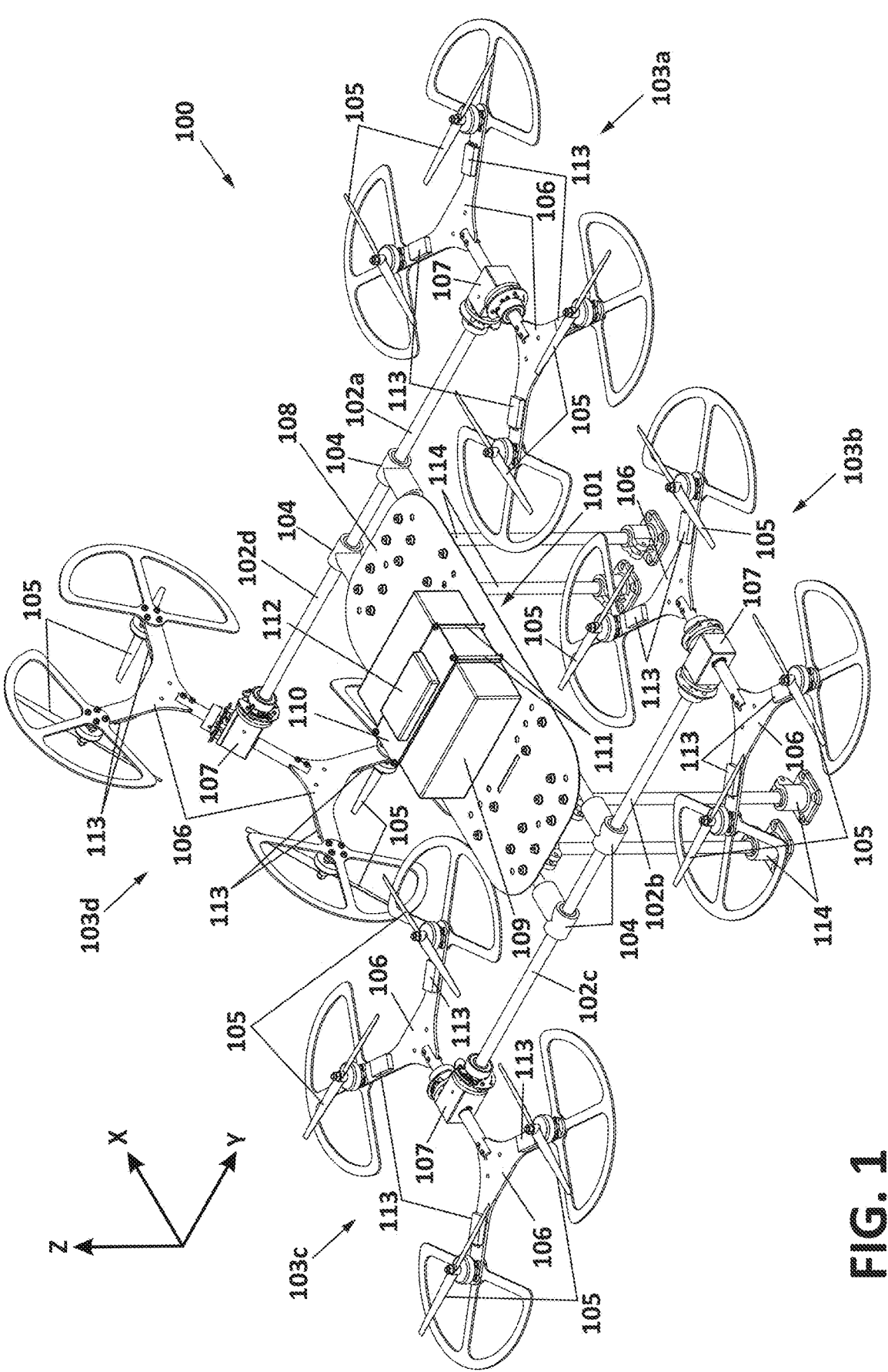
FIG. 1 shows a perspective view of an omnidirectional vehicle with rotary junctions and rotary encoders, according to a particular embodiment of the invention.

FIG. 1 shows a perspective view of an omnidirectional vehicle 100 with rotary junctions and rotary encoders, according to a particular embodiment of the invention. It should be understood that the example omnidirectional vehicle 100 may include additional components and that some of the components described herein may be removed and/or modified without departing from a scope of the example omnidirectional vehicle 100. Additionally, implementation of the example omnidirectional vehicle 100 is not limited to such example as shown in FIG. 1.

The omnidirectional vehicle 100 comprises a main body 101, arms 102*a-d* coupled to the main body 101 and extending radially therefrom and four quadrotors 103*a-d* coupled to the respective arms 102*a-d*. While in the embodiment of FIG. 1 pairs of arms 102*a*/102*d* and 102*b*/102*c* form one single longitudinal body, respectively, coupled to the main body 101 by interposition of fastening elements 104 directly attached to the main body 101, in some other embodiments each arm 102*a-d* may be an independent longitudinal body directly coupled to the main body 101 or by interposition of similar or different fastening elements. Each quadrotor 103*a-d* comprises four rotors 105 rigidly attached to the frame 106 of the quadrotors 103*a-d* at fixed positions and orientations.

Each quadrotor 103*a*-103*d* is coupled to the respective arm 102*a-d* by interposition of a rotary junction 107 which in turn is formed by a first revolute joint (not shown in this figure) coupled to the corresponding arm 102*a-d* and a second revolute joint (not shown in this figure), that is perpendicularly coupled to the first revolute joint.

The main body 101 comprises a planar elongated support element 108 on which a box 109, containing the batteries and other electrical and electronic components (not shown), is coupled to. The box 109 is attached to the support element 108 by a retaining plate 110 and treaded studs 111. A controller 112 is attached to the top surface of the retaining plate 110 and is configured to control the functioning of the whole omnidirectional vehicle 100, including operation of the four quadrotors 103*a-d*. Besides, each rotor 105 has an individual electronic speed controller 113 attached to the frame 106 and located close to them. These electronic speed controllers 113 comprise the hardware and software needed to receive instructions from the controller 112 and to control and regulate the speed of the electric motor of the rotor 105 based on the received instructions. They may also provide reversing of the motor and dynamic braking.

In such embodiment, the omnidirectional vehicle 100 has been depicted with four support legs 114 to support the omnidirectional vehicle when landed.

While the embodiment of FIG. 1 is shown with all the batteries located on the main body 101 and a centralized management system, with one single controller 112 located on the main body 101, in some other embodiments the batteries and controller may be distributed between the main body and the quadrotors.

In such embodiment, the rotation centres of the four quadrotors 103*a-d* are contained both in the geometric axis of the main body arms 102*a-d* and in the plane defined by the propulsion module arms, so collisions between the quadrotors 103*a-d* and the main body 101 are avoided at every possible position of the quadrotors 103*a-d* relative to the main body 101.

In the embodiment shown in FIG. 1 the quadrotors 103*a-c* are in their rest positions and contained within the same plane than the main body 101 (plane X-Y) while quadrotor 103*d* has turned about 45° around axis Y via the first revolute joint (not shown in this figure) and about 90° around axis X via the second revolute joint (not shown in this figure) of the rotary junction 107.

While the embodiment of FIG. 1 shows an omnidirectional vehicle 100 comprising four quadrotors 103*a-d* homogenously distributed around the main body 101, in some other embodiments, the omnidirectional vehicle may comprise a different number of orientable propulsion modules, a different type of propulsion module, a different number of propulsion units, a different type of propulsion units and a different distribution or configuration.

Figure 2:
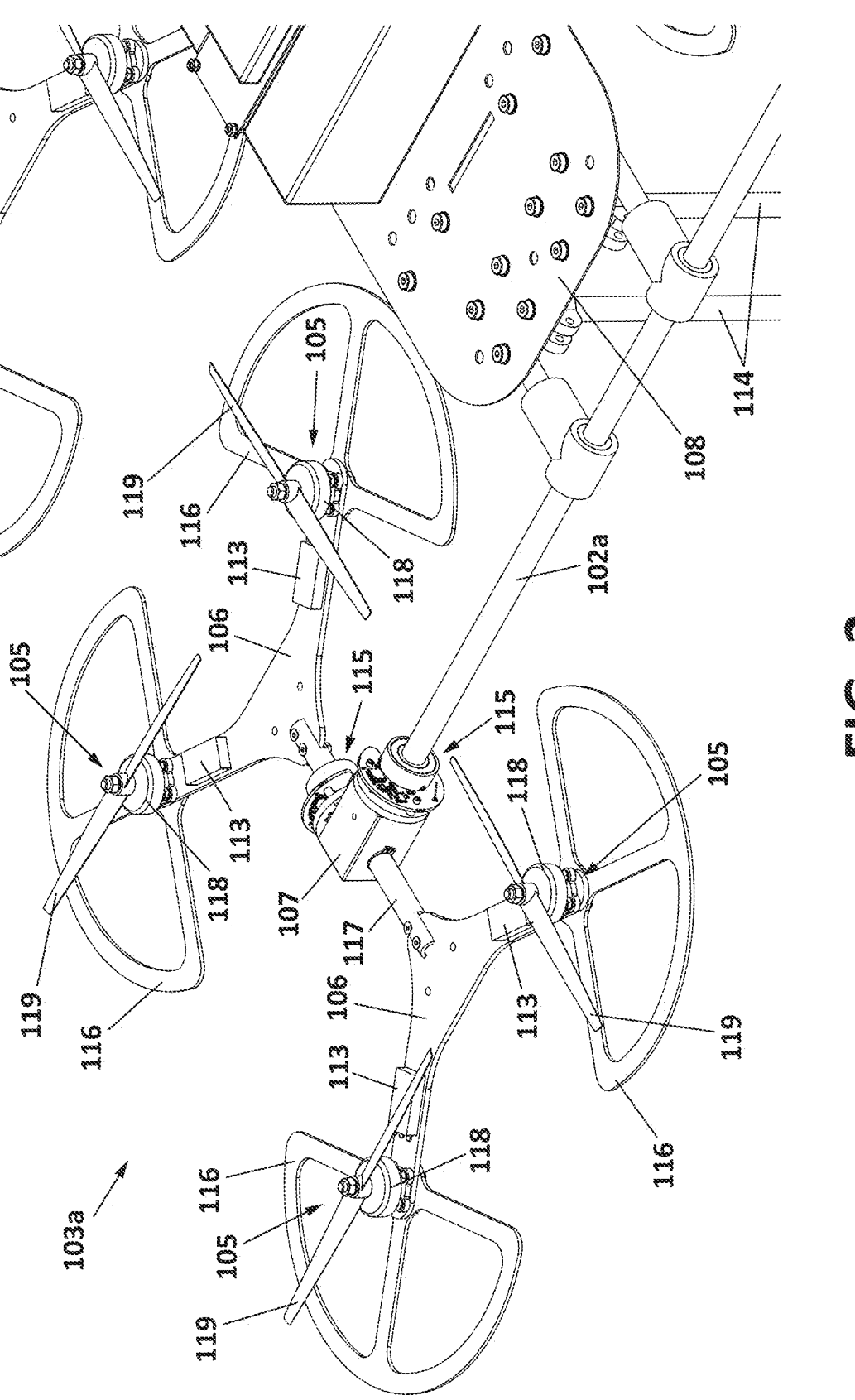
FIG. 2 shows a detailed perspective view of one of the orientable multirotor of the omnidirectional vehicle of FIG. 1 with its rotary junction and rotary encoder.

FIG. 2 shows a detailed perspective view of one of the orientable quadrotors 103*a* of the omnidirectional vehicle 100 of FIG. 1 with its rotary junction 107 and rotary encoders 115. The frame of the multirotor 103*a* is formed by two semi-frames 106 joined to each other by interposition of the rotary shaft 117 that passes through the rotary junction 107. The rotors 105 are located at the free ends of the semi-frames 106.

Each rotor 105 has a protector guard 116 located beneath the motor 118 and the propeller 119, said rotors 105 being actuated by the respective electronic speed controllers 113 that are coupled to the semi-frames in proximity to the motors 108 and connected to the controller 112 (not shown in this figure) from which instructions to operate the rotors 105 are received. The connection between the batteries and the motors 118 and the electronic speed controllers 113 is carried out by cables (not shown). The connection between the controller 112 and the electronic speed controllers 113 may be carried out by cables or by a wireless connection (WiFi, Bluetooth, GSM, GPRS, etc.).

Figure 3:
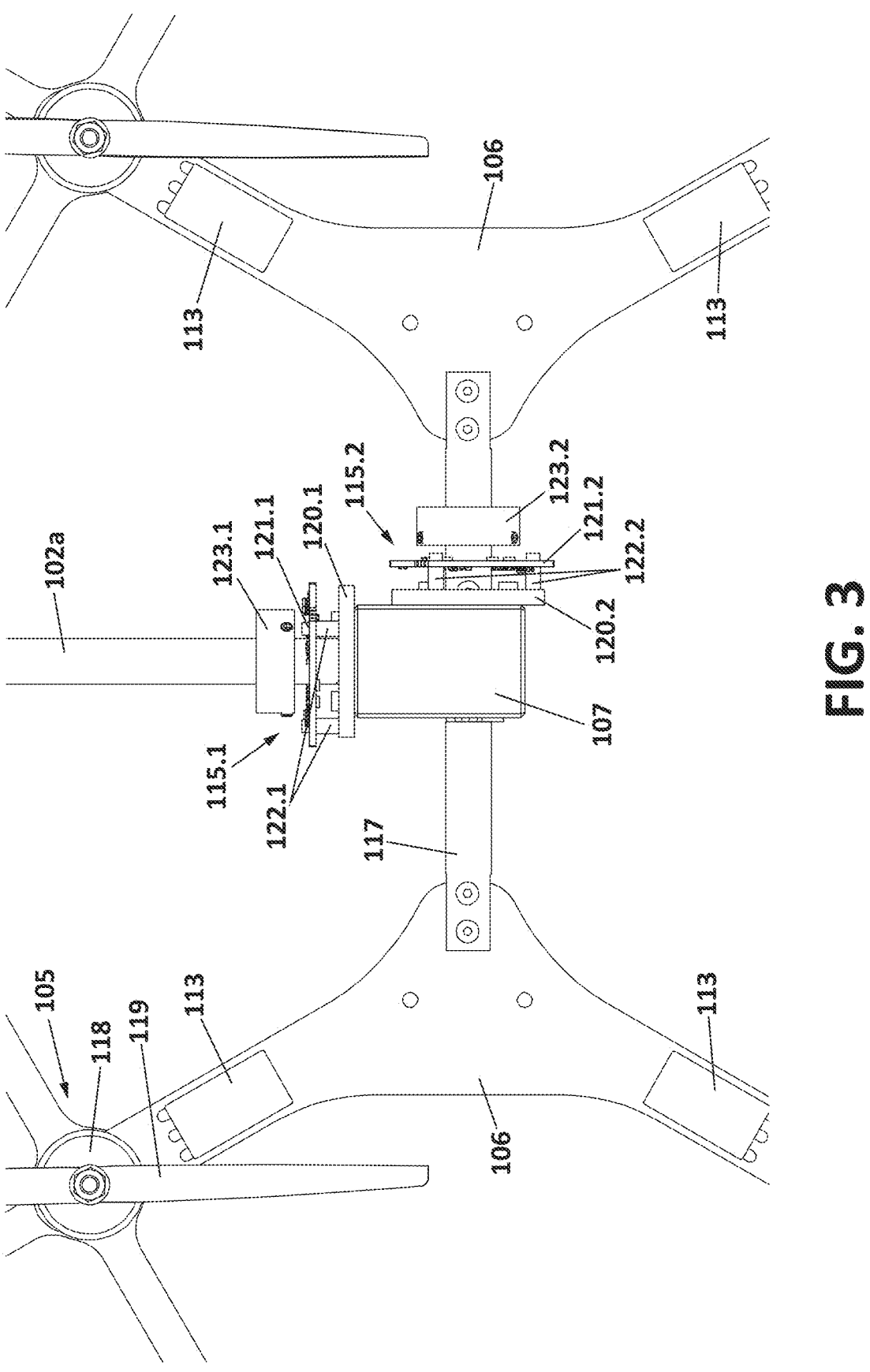
FIG. 3 shows a detailed top view of the rotary junction of FIG. 2.

FIG. 3 shows a detailed top view of the rotary junction 107 of FIG. 2. The arm 102*a* is fixedly coupled to the main body 101 of the omnidirectional vehicle 100 and its free end is inserted into the rotary junction 107 such that the rotary junction is able to rotate around the arm 102*a*. In turn, the rotary shaft 117 of the quadrotor 103*a* passes through the rotary junction 107 such that said rotary shaft, and thus the quadrotor 103*a*, is able to rotate relative to the rotary junction 107.

The magnetic rotary encoder 115.1 comprises a metallic ring 120.1 coupled to the outer surface of the rotary junction 107 in correspondence with the orifice through which the arm 102*a* is inserted. A ring-shaped printed circuit board 121.1 including the sensors and all the rest of electric and electronic components of the magnetic rotary encoder 115.1 is coupled to the metallic ring 120.1 by threaded studs 122.1. The magnetic rotary encoder 115.1 further comprises a ring-shaped magnet 123.1 coupled to the arm 102*a*. The other magnetic rotary encoder 115.2 also comprises a metallic ring 120.2 coupled to the outer surface of the rotary junction 107 in correspondence with the orifice through which the rotary shaft 117 of the quadrotor 103*a* is inserted. A ring-shaped printed circuit board 121.2 including the sensors and all the rest of electric and electronic components of the magnetic rotary encoder 115.2 is coupled to the metallic ring 120.2 by threaded studs 122.2. The magnetic rotary encoder 115.2 further comprises a ring-shaped magnet 123.2 coupled to the arm 102*a*.

The magnetic rotary encoders 115.1-2 can use two or more poles located in the respective magnets 123.1-2 to represent the encoder position to the magnetic sensor (typically magneto-resistive or Hall Effect) located in the printed circuit boards 121.1-2. The magnetic sensor reads the magnetic pole positions. This code can be read by a controlling device, such as a microprocessor or microcontroller located in the printed circuit boards 121.1-2 to determine the angle of the shaft (in particular the arm 102*a* and the rotary shaft 117) relative to the rotary junction 107. Alternatively, this code could be sent to the controller located in the main body 101 (in the case of having an omnidirectional vehicle with a centralized management structure) or the controller located in the quadrotor 103*a* (in the case of having a distributed management structure). The code can be translated into an absolute angle by using dedicated algorithms. The magnetic rotary encoders are especially convenient in conditions where other types of encoders may fail due to dust or debris accumulation. Magnetic rotary encoders are also relatively insensitive to vibrations, minor misalignment, or shocks.

The combination of readings of the two rotary encoders 115.1-2 of the rotary junction 107 will provide the orientation of quadrotor 103*a* relative to the main body 101.

Figure 4:
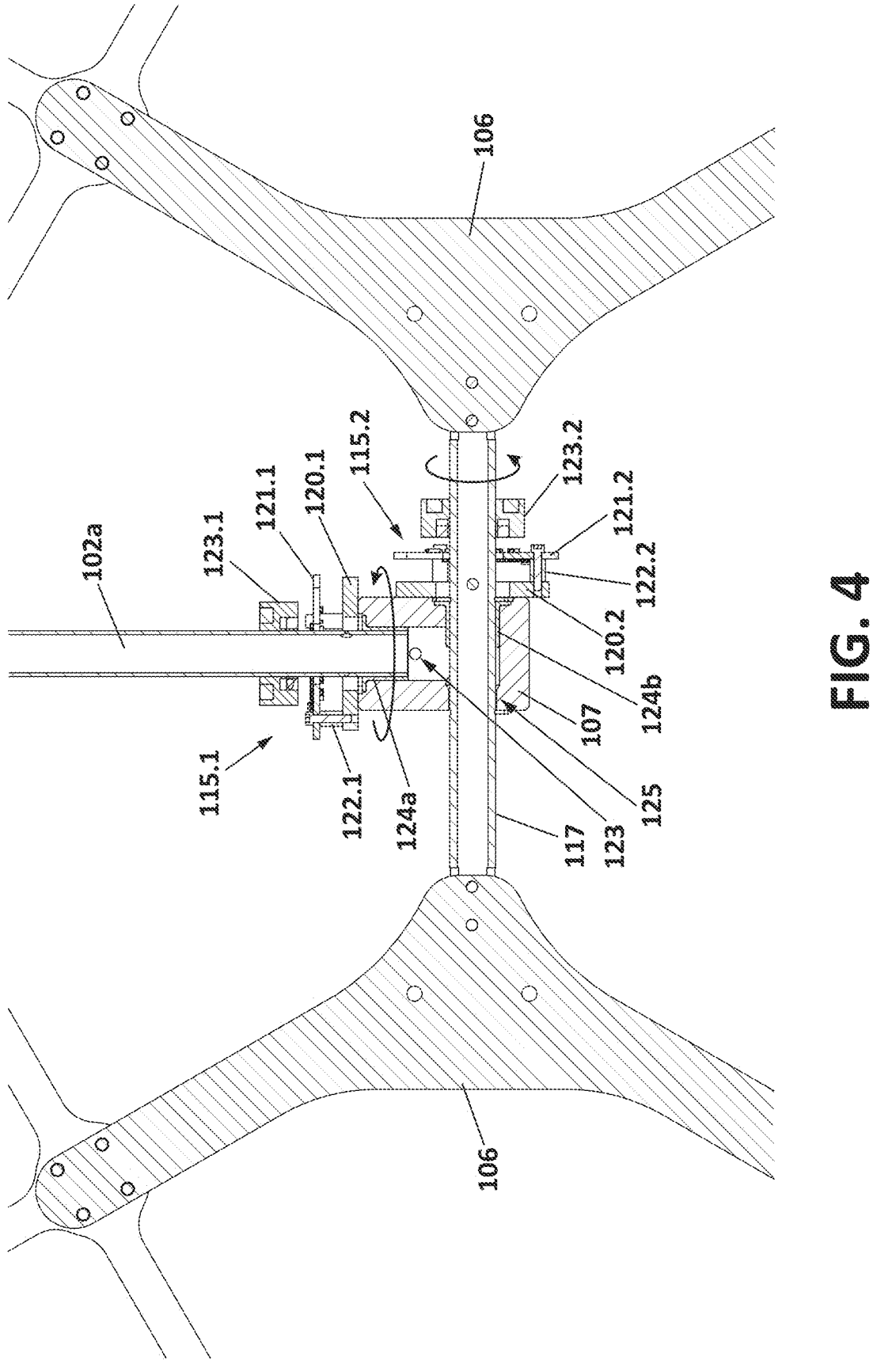
FIG. 4 shows a cut section of the rotary junction of FIG. 3 along line A-A.

FIG. 4 shows a cut section of the rotary junction and the rest of elements shown in FIG. 3 along line A-A. The rotary junction 107 is a rectangular solid block having a first orifice 123 through which the free end of the arm 102*a* is inserted and around which the rotary junction 107 is to rotate by interposition of a first friction bushing 124*a*. The rotary junction 107 further comprises a second orifice 125 perpendicular to the first orifice 123 through which the rotary shaft 117 coupled to the quadrotor 103*a* is inserted and inside which the rotary shaft 117 is to rotate relative to the rotary junction 107 by interposition of a second friction bushing 124*b*. While the embodiment of FIG. 4 is shown with the arm 102*a* and the rotary shaft 117 being hollow tubes to reduce the weight of the vehicle, they may be also solid rods.

Since the rotational movement of the rotary junction 107 relative to the arm 102*a* is completely independent of the rotational movement of the rotary shaft 117 relative to the rotary junction 107, the arm 102 and the rotary shaft 117 do not contact each other existing an empty space between both orifices 123,125. Alternatively, instead of existing an empty space there may be a portion of the rotary junction 107 separating both orifices 123,125.

While FIGS. 1-4 shows four magnetic rotary encoders to measure the angle of the shafts (in particular the arm and the rotary shaft) relative to the rotary junctions, other types of rotary encoders capable of carrying out said measure (e.g., optical encoders, capacitive encoders, resistive encoders, etc.) could be used. In any case, these rotary encoders 115.1-2 are elements external to the rotary junction 107 which avoid having to design the rotary junction with inner spaces communicated with the arm 102*a* and the rotary shaft 117 to incorporate gyroscopes, accelerometers or any other inertial measurement unit to determine the orientation of the quadrotor 102*a* relative to the main body 101. This significantly simplifies the design of the omnidirectional vehicle, reduces its manufacturing and maintenance costs at the same time that it provides a more reliable measurement of the relative position of the quadrotors with respect to the cabin.

Figure 5A:
FIG. 5A shows a perspective detailed view of the rotary junction of FIG. 2 including slip rings.

FIG. 5A shows a perspective detailed view of the rotary junction 107 of FIG. 2 including a first slip ring 126*a* used to connect a stationary element, the arm 102*a*, to a rotating system, the rotary junction 107, a second slip ring 126*b* used to connect the rotary junction 107 to one of the frames 106 of the quadrotor 103*a* and a third slip ring 126*b* used to connect the rotary junction 107 to the other one of the frames 106 of the quadrotor 103*a*. A first connection ring 127*a* of the first slip ring 126*a* is fixedly attached to the arm 102*a* and is connected to wires 128 coming from the main body 101 and transmitting data from the controller 112 and/or power from the batteries. A second connection ring 129a of the first slip ring 126a is rotatably coupled to the arm 102a and fixedly connected to the rotary junction 107 by means of a rigid piece 132a and is connected to wires 130 that are to transmit the data and/or power from the slip ring 126 to the electronic speed controllers 113 via the second and third slip rings 126b-c and the printed circuit boards 121.1-2 of the rotary encoders 115.1-2. The second and third slip rings 126b-c comprise respective first connections rings 127b-c fixedly attached to the rotary shaft 117 that are connected to the respective electronic speed controllers 113 via wires 133 to transmit data from the controller 112 and/or power from the batteries. The second and third slip rings 126b-c further comprise respective second connections rings 129b-c rotatably coupled to the rotary shaft 117 and fixedly connected to the rotary junction 107 by means of a rigid pieces 132b-c. These second connections rings 129b-c are also connected to the wires 130 that are to transmit the data and/or power from the first slip ring 126 to the second and third slip rings 126b-c. The corresponding first and second connection rings 127a-c, 129a-c are internally connected to each other on their inner connect surfaces for data and/or power transmission. Wires 130 are also coupled to the rotary junction 107 by means of clamps, fasteners or similar 134.

Figure 5B:
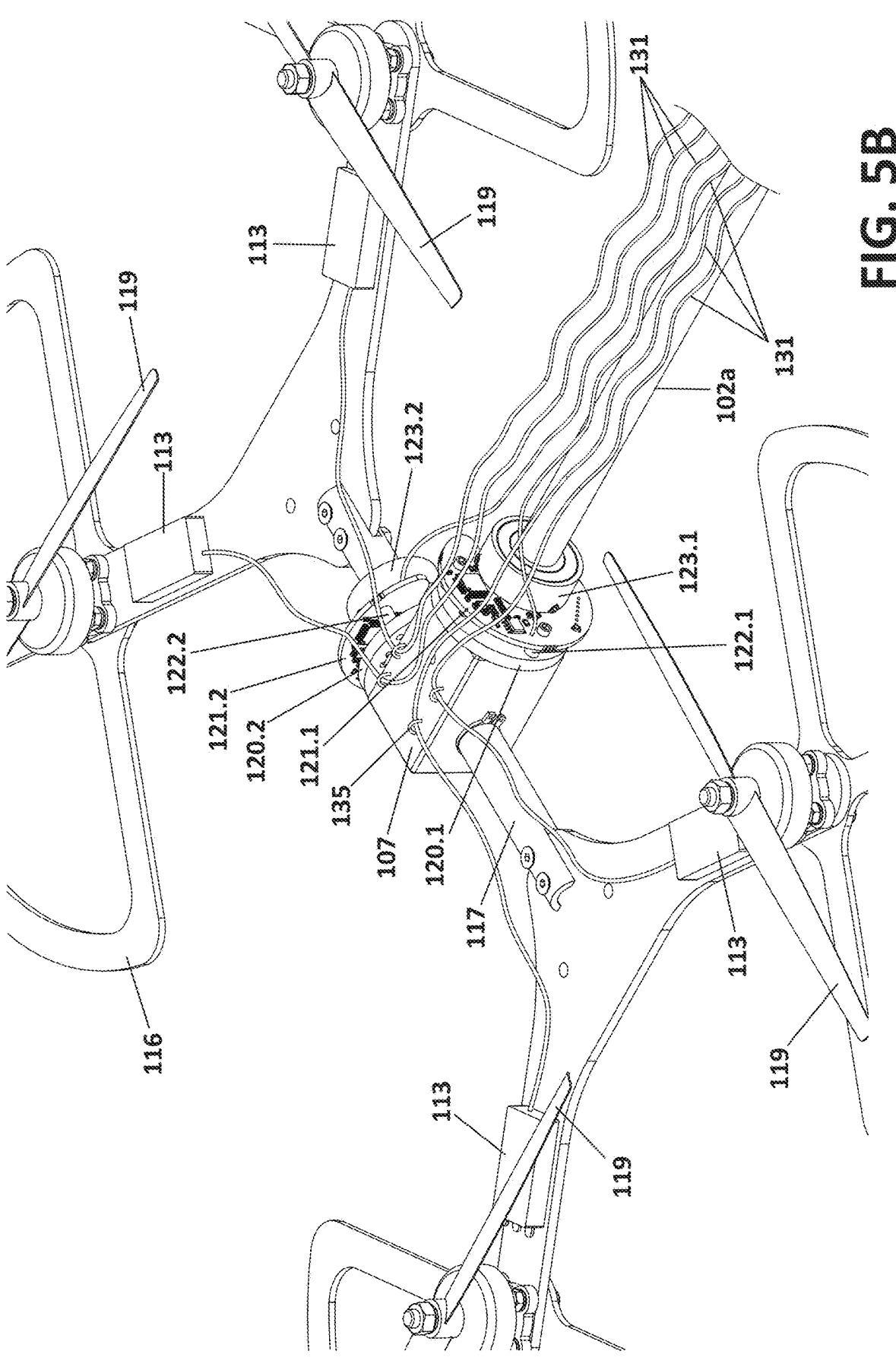
FIG. 5B shows the perspective detailed view of the rotary junction of FIG. 5A but including loose wires instead of slip rings.

FIG. 5B shows the perspective detailed view of the rotary junction 107 as in FIG. 5A but including loose wires 131 instead of a slip rings 126a-c. The controller 112 or the electronic speed controllers 113 may implement automatic unwinding algorithms to limit the number of loops the loose wires 131 can have. Alternatively, or in combination, the rotary junction 107 may integrate a mechanical limit to limit the number of loops the loose cables 131 can have. Said loose cables 131 are to allow transmission of data and electrical power between the main body 101 and the quadrotor 103a. These loose wires 131 are also coupled to the rotary junction 107 by means of clamps, fasteners or similar 135.

In some other embodiments, the omnidirectional vehicle may integrate some other means for data and power transmission such as wireless transmission subsystems able to transmit data and power between the main body and the quadrotors and vice versa.

Figure 6A:
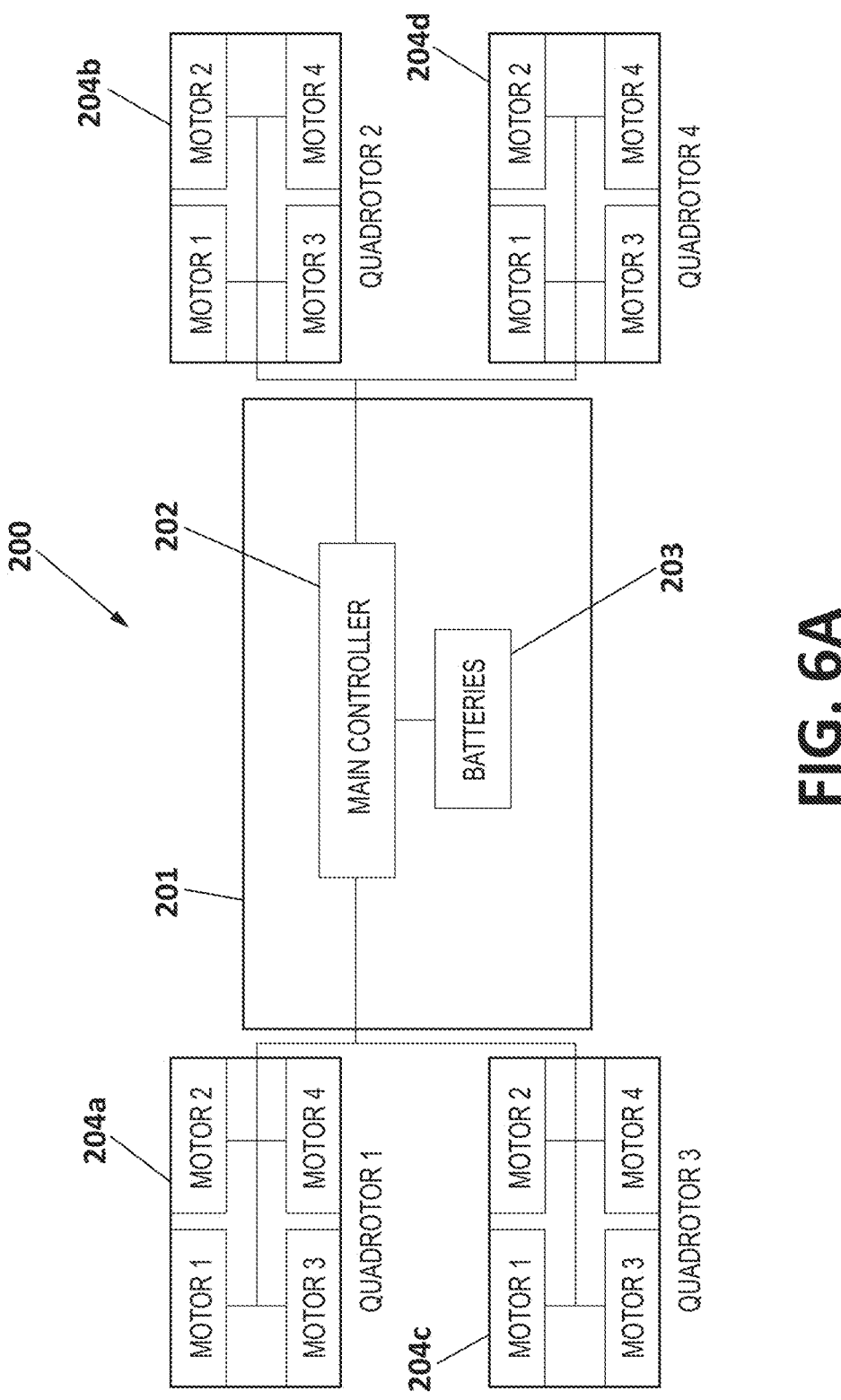
FIG. 6A shows a block diagram of an omnidirectional vehicle with centralized management and power distribution subsystems, according to a particular embodiment of the invention.

FIG. 6A shows a block diagram of an omnidirectional vehicle with centralized management and power distribution subsystems, according to a particular embodiment of the invention. It should be understood that the example omnidirectional vehicle 200 may include additional components and that some of the components described herein may be removed and/or modified without departing from a scope of the example omnidirectional vehicle 200.

Additionally, implementation of the example omnidirectional vehicle 200 is not limited to such example as shown in FIG. 6A.

In such embodiment, the omnidirectional vehicle 200 comprises a main controller 202 located in the main body 201 and configured to operate the plurality of orientable quadcopters 204a-d. Besides, the omnidirectional vehicle 200 comprises a single battery or pack of batteries 203 in the main body 201 to provide electrical power to the orientable quadcopters 204a-d and to the rest of electrical and electronic components of the vehicle 200. Data and electrical power can be transmitted from the main body 201 to the orientable quadcopters 204a-d via slip rings or the loose cables 205. This embodiment shows an omnidirectional vehicle with a centralized control and power distribution architecture which is especially convenient for reducing costs, minimizing the components that can fail, facilitating the assembly of the vehicle, reducing the inertia of the propulsion modules, and making the system more agile and efficient.

Figure 6B:
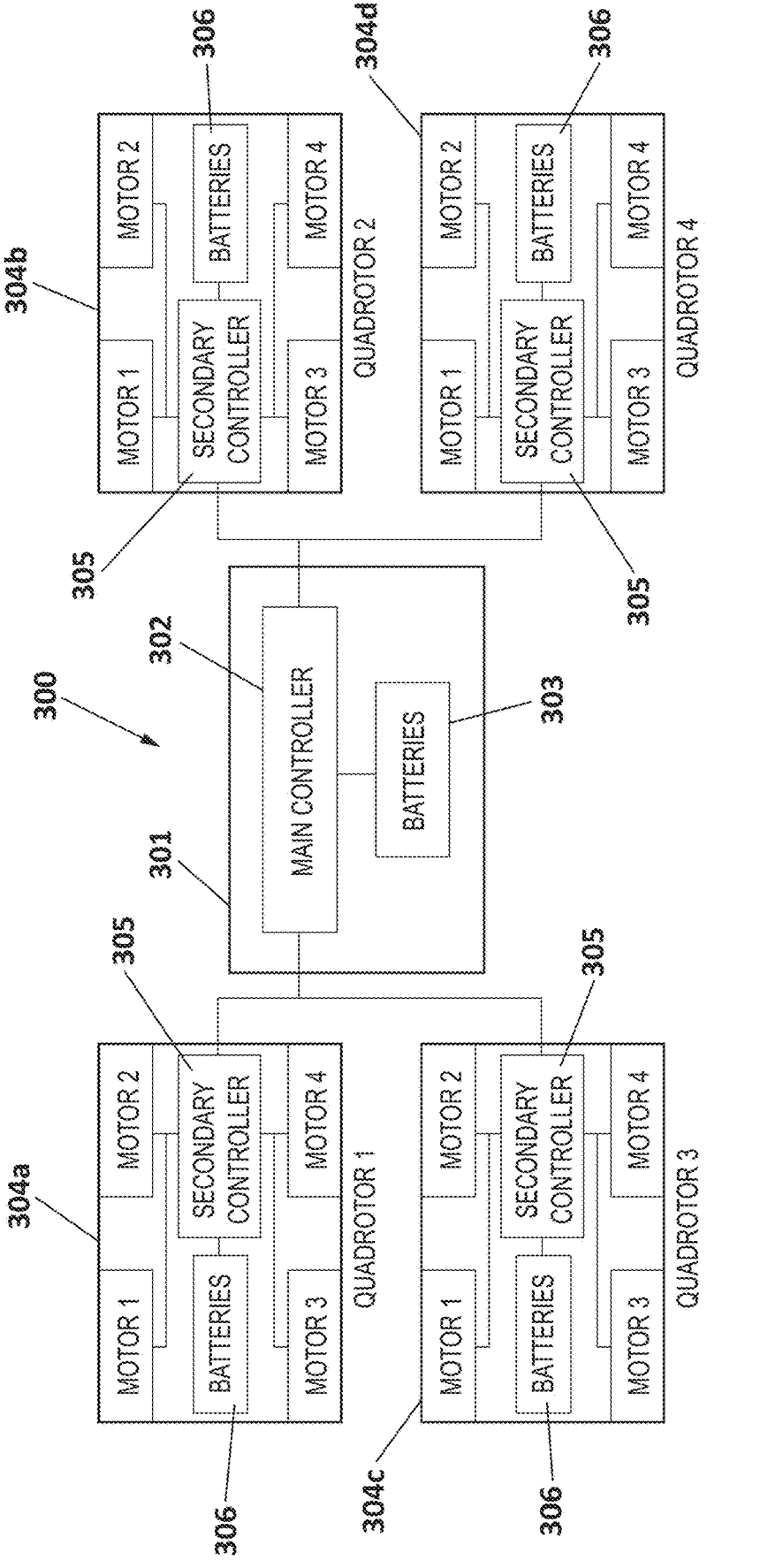
FIG. 6B shows a block diagram of an omnidirectional vehicle with distributed management and power distribution subsystems, according to a particular embodiment of the invention.

FIG. 6B shows a block diagram of an omnidirectional vehicle 300 with distributed management and power distribution subsystems, according to a particular embodiment of the invention. It should be understood that the example omnidirectional vehicle 300 may include additional components and that some of the components described herein may be removed and/or modified without departing from a scope of the example omnidirectional vehicle 300. Additionally, implementation of the example omnidirectional vehicle 300 is not limited to such example as shown in FIG. 6B.

Figure 7:
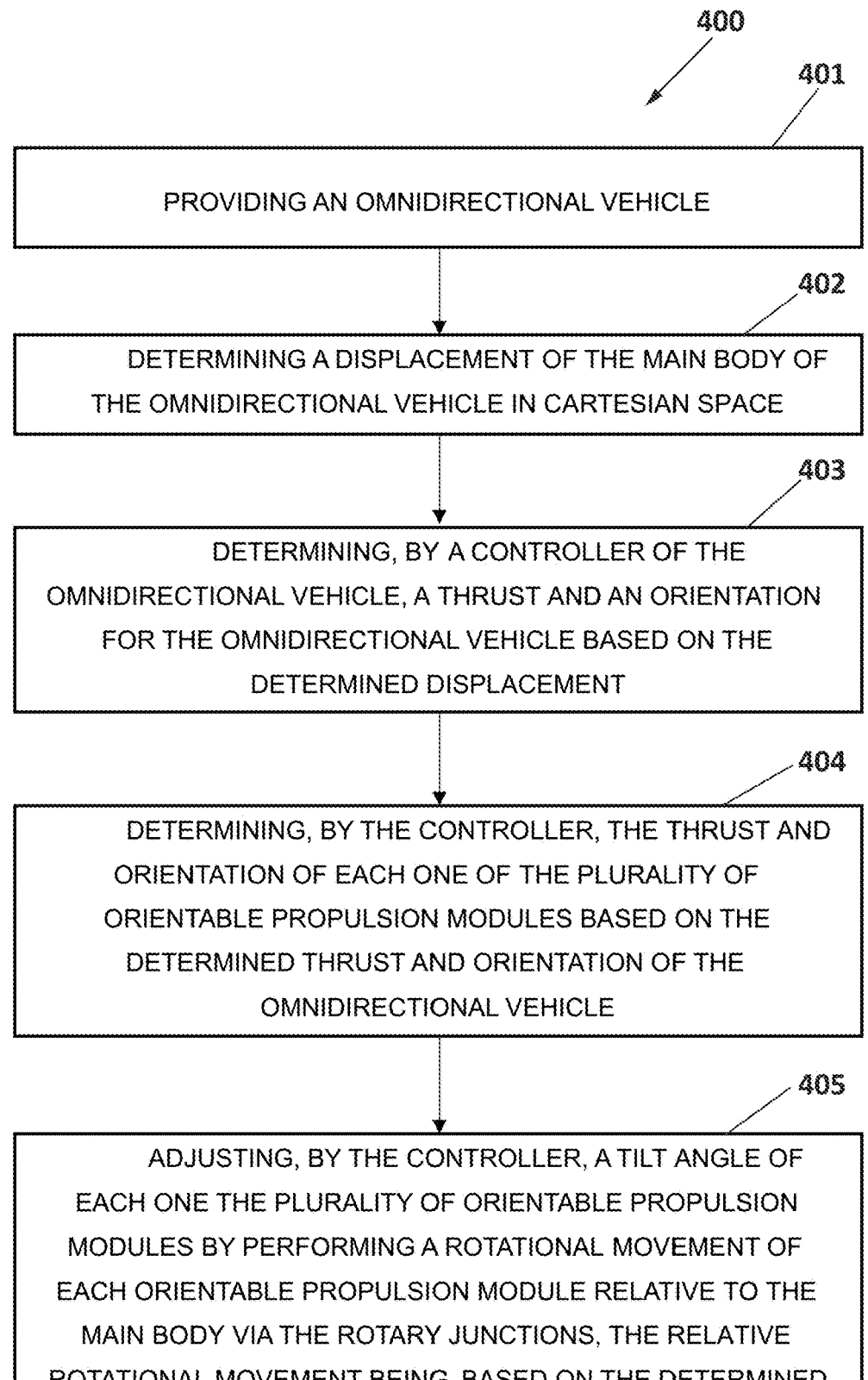
FIG. 7 is a flow diagram of a method for manoeuvring an omnidirectional vehicle, according to a particular embodiment of the invention.

In such embodiment, the omnidirectional vehicle 300 comprises a primary controller 302 located in the main body 301 and a plurality of secondary controllers 305, each secondary controller 305 being located in a corresponding orientable propulsion module 304a-d. The plurality of secondary controllers 305 are configured to operate the respective orientable propulsion modules 304a-d they are mounted on and the primary controller 302 is configured to manage the plurality of secondary controllers 305. Preferably, the batteries 303 in the main body 301 are to feed the electric and electronic components of the main body 301 while the batteries 306 in the orientable propulsion modules 304a-d are to feed the electric and electronic components of the respective propulsion modules 304a-d. However, since data and electrical power can be transmitted from the main body 301 to the orientable propulsion modules 304a-d and vice versa, in the event of any battery failure or battery exhaustion, electrical power can be transmitted from the main body 301 or any of the orientable propulsion modules 304a-d to any component within the omnidirectional vehicle 300. This embodiment shows an omnidirectional vehicle with a distributed control and power distribution architecture in which any one of the plurality of controllers may take control over the whole vehicle in case the controller currently in charge of managing the omnidirectional vehicle fails. Moreover, while control redundancy increases security and reliability of the vehicle, power redundancy increases the operating autonomy of the vehicle FIG. 7 is a flow diagram of a method 400 for manoeuvring an omnidirectional vehicle, according to a particular embodiment of the invention.

At step 401 of the method 400, an omnidirectional vehicle as previously described is provided. Preferably, the provided omnidirectional vehicle will be an overactuated omnidirectional vehicle. At step 402 of the method 400, a displacement of the main body of the omnidirectional vehicle in cartesian space is determined. After that, at step 403 of the method 400, the controller of the omnidirectional vehicle determines a thrust and an orientation for the omnidirectional vehicle based on the desired displacement. At step 404 of the method 400, the controller further determines the thrust and orientation of each one of the plurality of orientable propulsion modules based on the determined thrust and orientation of the omnidirectional vehicle. Then, at step 405 of the method 400, the controller adjusts a tilt angle of each one the plurality of orientable propulsion modules by performing a rotational movement of each orientable propulsion module relative to the main body via the rotary junctions, the relative rotational movement being based on the determined orientation.

In this text, the term "comprises" and its derivations (such as "comprising", etc.) should not be understood in an excluding sense, that is, these terms should not be interpreted as excluding the possibility that what is described and defined may include further elements.

The invention is obviously not limited to the specific embodiments described herein, but also encompasses any variations that may be considered by any person skilled in the art within the general scope of the invention as defined in the claims.

The invention claimed is:

1. An omnidirectional vehicle (100), comprising:
a main body (101);
a plurality of arms (102*a-d*) extending radially from the main body (101) and coupled thereto; and
a plurality of orientable propulsion modules (103*a-d*),
each orientable propulsion module (103*a-d*) being coupled to a respective arm (102*a-d*) and comprising:
a frame (106), and
at least three propulsion units (105) are rigidly attached to the frame (106) at a respective fixed positions and orientations;
wherein each one of the plurality of orientable propulsion modules (103*a-d*) is coupled to the respective arm (102*a-d*) by interposition of a rotary junction (107), the rotary junction being formed by a first passive revolute joint coupled to the arm (102*a-d*) and a second passive revolute joint coupled to the orientable propulsion module (103*a-d*) wherein a rotation axis of the second revolute joint is perpendicular and coplanar to a rotation axis of the first revolute joint;
wherein the first revolute joint is configured to allow the orientable propulsion module (103*a-d*) to rotate around the arm (102*a-d*) and the second revolute joint is configured to allow the orientable propulsion module (103*a-d*) to rotate around a rotary shaft (117) which is perpendicular to the arm (102*a-d*) such that the orientable propulsion module (103*a-d*) is provided with two degrees of freedom with respect to the main body (101); and
comprising a rotary encoder (115) located in proximity to each revolute joint that is configured to monitor the orientation of each orientable propulsion module (103*a-d*) relative to the main body (101);
wherein each rotary junction (107) comprises a body having a first orifice 123) through which the corresponding arm (102*a-d*) is inserted and around which the rotary junction (107) is to rotate and a second orifice (125) perpendicular to the first orifice (123) through which a rotary shaft (117) coupled to the respective orientable propulsion module (103*a-d*) is inserted and inside which the rotary shaft (117) is to rotate;
and wherein the rotary junction is a single body in which both consecutive and perpendicular revolute joints are integrated.

2. The omnidirectional vehicle (100) according to claim 1, wherein the centres of rotation of the plurality of orientable propulsion modules lay in the geometric axes of the plurality of arms (102*a-d*), while being coplanar with a longitudinal axis and a mid-plane of the frame (106) of the orientable propulsion modules (103*a-d*).

3. The omnidirectional vehicle (100) according to claim 2, wherein each one of the at least three propulsion units (105) is configured to generate a torque and wherein said torque is generated so as to be functionally independent of the thrust modulus generated by said propulsion unit.

4. The omnidirectional vehicle (100) according to claim 1, wherein each one of the at least three propulsion units (105) is an independently controllable propulsion unit and is configured to generate an independent thrust modulus.

5. The omnidirectional vehicle (100) according to claim 1, wherein the at least one of the at least three propulsion unit (105) is selected from a group comprising rotors, propellers, turboprop engines, jet engines and any combination thereof.

6. The omnidirectional vehicle (100) according to claim 1, wherein a centre of mass of the orientable propulsion modules (103*a-d*) in landing configuration are located below a centre of rotation of their respective rotary junctions (107).

7. The omnidirectional vehicle (100) according to claim 1, wherein the omnidirectionally orientable vehicle (103*a-d*) is selected from a group comprising an omnidirectional aerial vehicle, an omnidirectional underwater vehicle, an omnidirectional space aerial vehicle or any combination thereof.

8. The omnidirectional vehicle (100) according to claim 1, comprising slip rings (126*a-c*) electrically connecting the main body (101) and the orientable propulsion modules (103*a-d*), the slip rings (126*a-c*) being configured to allow transmission of at least one of data and electrical power between the main body (101) and the orientable propulsion modules (103*a-d*).

9. The omnidirectional vehicle (100) according to claim 1, comprising: a controller and a plurality of loose cables (131) electrically connecting the main body (101) and the orientable propulsion modules (103*a-d*),
wherein the controller operate the rotary junction according to an automatic unwinding algorithm or a mechanical limit such that a number of loops of the loose cables (131) is limited and the plurality of loose cables (131) are configured to allow transmission of at least one of data and electrical power between the main body (101) and the orientable propulsion modules (103*a-d*).

10. The omnidirectional vehicle (200) according to claim 1, comprising a controller (202) located in the main body (201) configured to operate the plurality of orientable propulsion modules (204*a-d*).

11. The omnidirectional vehicle (300) according to claim 1, comprising:
a primary controller (302) located in the main body (301); and
a plurality of secondary controllers (305), each secondary controller (305) being located in a corresponding orientable propulsion module (304*a-d*);
wherein each secondary controller (305) is configured to operate the respective orientable propulsion module (304*a-d*) it is mounted on and the primary controller (302) is configured to manage the plurality of secondary controllers (304*a-d*).

12. The omnidirectional vehicle (100) according to claim 1, wherein the omnidirectional vehicle (100) is an overactuated omnidirectional vehicle.

13. A method (400) for manoeuvring an omnidirectional vehicle, comprising:
providing (401) an omnidirectional vehicle as claimed in claim 1 comprising, preferably an overactuated omnidirectional vehicle;
determining (402) a displacement of the main body of the omnidirectional vehicle in cartesian space;
determining (403), by a controller of the omnidirectional vehicle, a thrust and an orientation for the omnidirectional vehicle based on the determined displacement;
determining (404), by the controller, the thrust and orientation of each one of the plurality of orientable propulsion modules based on the determined thrust and orientation of the omnidirectional vehicle; and
adjusting (405), by the controller, a tilt angle of each one the plurality of orientable propulsion modules by performing a rotational movement of each orientable propulsion module relative to the main body via the rotary junctions, the relative rotational movement being based on the determined orientation.

* * * * *